United States Patent Office 3,521,956
Patented July 28, 1970

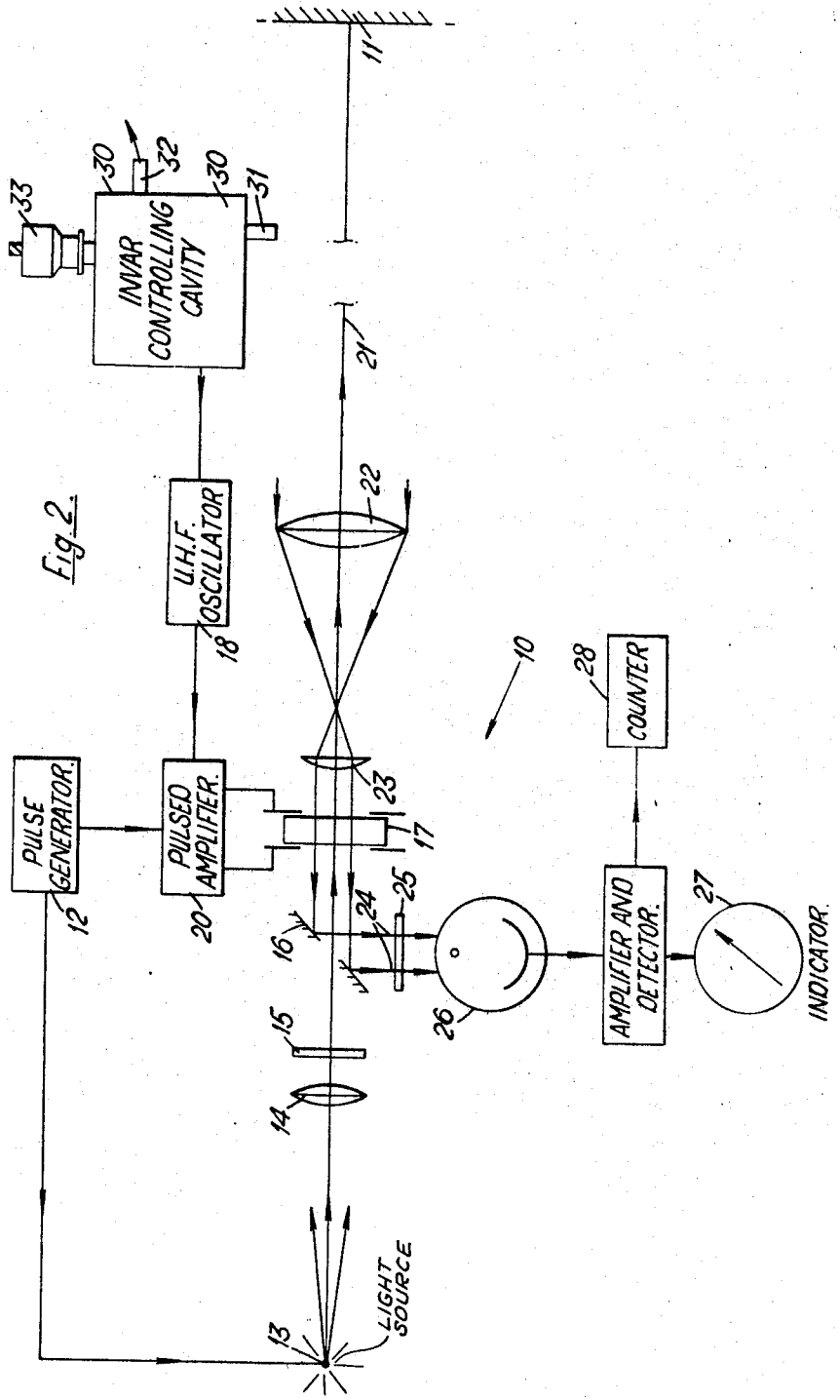

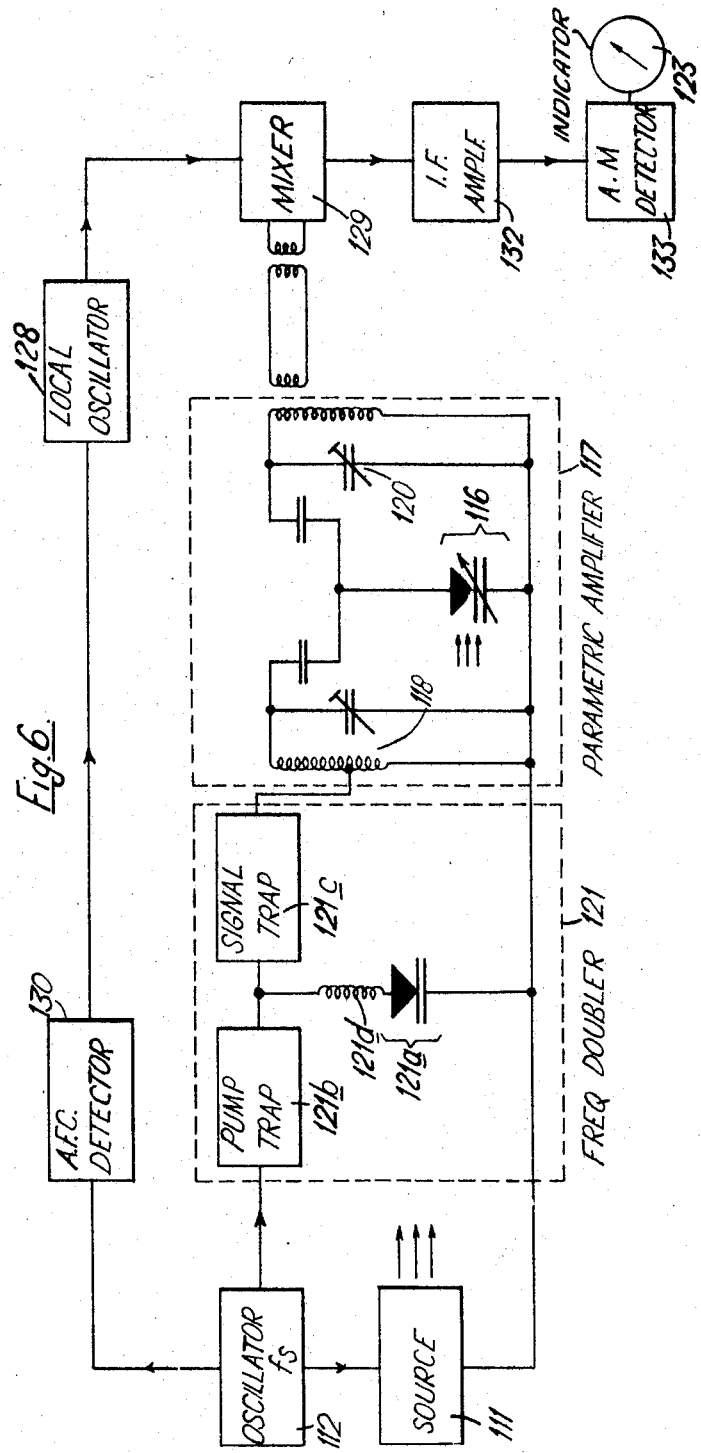

3,521,956
DISTANCE MEASURING APPARATUS WHICH COMPENSATES FOR AMBIENT ATMOSPHERIC REFRACTIVE INDEX
Keith Davy Froome and Robert Howard Bradsell, Teddington, England, assignors to National Research Development Corporation, London, England, a corporation of Great Britain
Filed Nov. 9, 1964, Ser. No. 409,844
Claims priority, application Great Britain, Nov. 11, 1963, 4,480/63; Feb. 3, 1964, 4,565/64; Feb. 21, 1964, 7,473/64; Feb. 24, 1964, 7,687/64; Feb. 25, 1964, 7,858/64
Int. Cl. G01c 3/08
U.S. Cl. 356—5                    18 Claims

ABSTRACT OF THE DISCLOSURE

A distance measuring apparatus for determining the length of a path comprises a modulated electro-magnetic radiation transmitter, a cavity resonator which monitors the wavelength of the modulated electro-magnetic radiation before transmission over the path, a temperature and pressure equalising device within the cavity resonator so that the temperature and pressure within the cavity resonator is substantially equal to the ambient atmospheric temperature and pressure along the path, and a wavelength changer for changing the resonant wavelength of the cavity resonator between two known values so as to determine the number of modulation wavelengths in the path. Physical dimensions of the cavity resonator, at resonance, determine the modulation wavelength.

This invention concerns improvements in or relating to distance measuring apparatus.

Methods of distance measurement using modulated electromagnetic radiation are well known, but in each case the measurement involves measuring a time (for example the time taken by the radiation to traverse the distance to be measured) or a frequency. The distance to be measured can be deduced from such measurements if the velocity of the radiation in the prevailing atmospheric conditions is known; this velocity is obtained from a knowledge of the velocity of electromagnetic radiation in vacuo and the refractive index of the atmosphere along the distance to be measured. Since a knowledge of the velocity of electromagnetic radiation is essential to these hitherto used methods, it follows that the accuracy of the distance measurement is fundamentally dependent on the accuracy of the velocity determination and the accuracy with which the atmospheric refractive index is known.

The invention provides a distance measuring apparatus for determining the length of a path comprising means transmitting over said path modulated electromagnetic radiation, receiver means for receiving the modulated electromagnetic radiation after it has been transmitted over said path, detector means for detecting the modulation phase of the received radiation; at least one cavity resonator monitoring the wavelength of said modulated electromagnetic radiation before transmission over said path, the physical dimensions of which at least one cavity resonator at resonance, determining the said modulation wavelength, means for rendering the temperature and pressure within the cavity resonator substantially equal to the ambient atmospheric temperature and pressure along the said path, and means for changing the resonant wavelength of said cavity resonator between at least two known values so as to determine the number of modulation wavelengths in said path and noting during the change the total modulation phase change produced in the electromagnetic radiation received at a given point after transmission over the said path, said change being directly related to the length thereof.

Being fundamentally independent of a knowledge of the velocity of electromagnetic radiation the present invention may be regarded in principle as a method in which a standard linear dimension (in this case, a dimension of a resonator) is divided into the distance to be measured. The accuracy of the method is therefore dependent on the accuracy of the standard linear dimensions. The apparatus according to the invention is preferably calibrated using a knowledge of the velocity of electromagnetic radiation, but it will be seen that a knowledge of this velocity is not essential for the calibration.

The invention will be explained, and apparatus for carrying the invention into effect will be described by way of example only, with reference to the accompanying drawings, in which:

FIG. 2 is a diagrammatic representation of an apparatus according to the invention;

FIG. 6 is a simplified block diagram showing, in more detail, part of the apparatus shown generally in FIG. 5;

Figure 1:
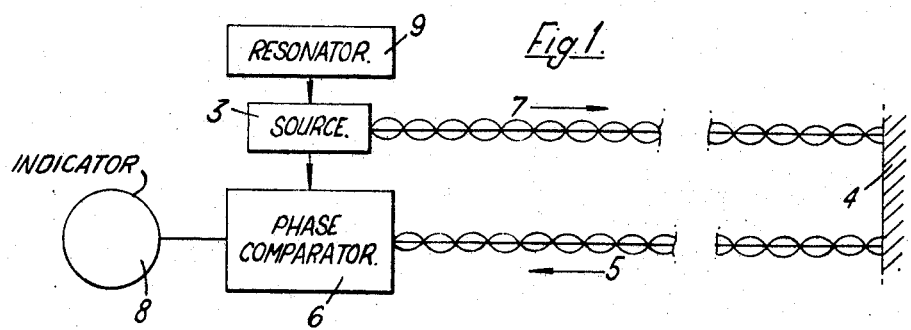
FIG. 1 is a diagram of a general arrangement for carrying the invention into effect.

The principle of the method of distance measurement according to the invention will be illustrated by reference to the accompanying FIG. 1.

A source of modulated electromagnetic carrier radiation, 3, is arranged to direct radiation over the distance to be measured to a distant reflector 4, the reflector 4 reflecting the radiation to cause it to return over the same distance. Returning radiation 5 which has traversed the distance to be measured is compared in a phase comparator device 6 with outgoing radiation 7 which is about to traverse the said distance. The device 6 is adapted to give an indication on an indicator 8 of the modulation phase difference between the outgoing radiation 7 and the returning radiation 5.

The source of modulated radiation 3 is modulated at a known wavelength which is determined by the dimensions of a resonator 9. The resonator 9 is open to the atmosphere of the site of distance measurement, a provision which, as will be apparent, renders the distance determination inherently compensated for the ambient atmospheric refractive index.

If $d$ is the distance from a given fiduciary point on the source 3 to a fiduciary point on the reflector 4, then $d$ may be expressed in terms of an integral number N of modulation half waves as follows:

$$d+I = N\frac{\lambda}{2} + \delta\frac{\lambda}{2} + p\frac{\lambda}{2} \qquad (1)$$

where:
$\lambda$ = modulation wavelength;
$p$ = a phase difference, being the fraction of a modulation half wave that $(d+I)$ is in excess of an integral number N of modulation half waves thus may be expressed as $p = p_0+$, where
$p_0$ = a reference phase difference dependent on the nature of the phase comparator device 6, a phase adjustment I fixed instrumental correction allowing for the difference in the position of the above-mentioned fiduciary points from the actual point of modulation in the source 3 and the equivalent reflection point in the distant reflector 4 respectively. This correction also takes into account any discrepancy between the point of modulation in the source 3 and the point of phase comparison in the comparator device 6.

The actual modulation wavelength $\lambda$ superimposed on the carrier radiation as it traverses the distance $d$ to be measured may be expressed in terms of the frequency $F_v$ which the resonator 9 would have if it were evacuated. Thus if $\mu_r$ is the refractive index of air or gas in the resonator 9 appropriate for the modulation frequency used and if $\mu_g$ is the group refractive index of air over the distance to be measured appropriate for the modulated carrier radiation, $$\lambda = \frac{1}{F_v K}$$

where $$K = \frac{\mu_g}{c_0 \mu_r}$$

$c_0$ being the velocity of electromagnetic waves in vacuo. Thus $$\lambda = \frac{c_0 \mu_r}{\mu_g F_v} \quad (2)$$

But from electromagnetic theory it follows that $F_v = c_0/f$ $(l, m, n)$, where $f$ $(l, m, n)$ is a function of the linear dimensions of the resonator 9. Thus, $$\lambda = \frac{\mu_r}{\mu_g} \cdot f(l, m, n)(l + H + T + t + P) \quad (3)$$

In Equation 3 H, T, $t$ and P are small correction factors which may be inserted as required:

H (approximately $6.0 \times 10^{-6}$ per mm. Hg) is a humidity correction which allows for the different effects of water vapour in the atmosphere (measured in mm. Hg.) at the modulation wavelength and the carrier wavelength (the refractive indices $\mu_r$, $\mu_g$ relating to dry air);

T (approximately 1 in $10^{-6}$ per ° C. is a temperature correction factor which allows for the difference between the actual temperature of the resonator 9 and the temperature at which it was calibrated;

$t$ is a temperature gradient correction which corrects for the effects of a temperature gradient over the distance to be measured; thus if the reflector 4 is at a temperature 10° C. lower than that of the source 3, $t = 5 \times 10^{-6}$, and P is a pressure correction, allowing for different barometric pressures at the source 3 and the distant reflector 4; thus if the reflector 4 were located at an altitude 1000 feet above that of the source 3, $P = 5 \times 10^{-6}$.

Substituting in Equation 1:

$$d + I = (N + \delta + p) \frac{\mu_r}{2\mu} \cdot f(l, m, n)(1 + H + T + t + P) \quad (4)$$

This Equation 4 expresses the distance $d$ to be measured in terms of the linear dimensions $l$, $m$, $n$ of the resonator 9 and is, it will be noted, independent of the velocity of electromagnetic waves. The ratio of the refractive indices, $\mu_r/\mu_g$, is substantially invariant with changes of atmospheric conditions if the atmospheric temperature and pressure in the resonator 9 are substantially the same as the prevailing atmospheric temperature and pressure over the distance $d$. Distance measurement by this method is, therefore, inherently compensated for the refractive index of the atmosphere. This is in contrast to other, known methods of distance measurement using modulated electromagnetic radiation in which the distance to be measured can be determined only after elaborate calculations and measurements involving the ambient atmospheric conditions and tedious refractive index corrections.

In the case where the carrier radiation is visible light, the need to apply a humidity correction H can be avoided if the air in the resonator 9 is dried, for the effect of atmospheric humidity on the speed of light (that is, along the distance to be measured) is negligibly small. Water vapour does have a substantial effect on the velocity of propagation in the radio and microwave range, however, so that it is necessary to remove water vapour from the resonator 9 if it is desired to avoid applying a humidity correction H.

FIG. 2 illustrates diagrammatically an electro-optic apparatus 10 for measuring the distance of a reflector 11 using apparatus in accordance with the invention. The apparatus comprises a pulse generator 12 which supplies power for a light source 13. The source 13 is preferably a triggered xenon flash tube, or a laser, delivering a high intensity light pulse. The light from said source 13 passes through a collimating lens 14 which provides a parallel beam of light. This parallel beam of light passes through a polariser 15, which plane polarises the beam of light, and the beam of plane polarised light emerging therefrom is directed, through an aperture in a plane mirror 16, to a birefringent crystal 17 of ammonium dihydrogen phosphate (ADP) or cuprous chloride. The crystal 17 is subjected to U.H.F. modulation pulses obtained from a modulation oscillator 18 through an amplifier 20, itself activated by the pulse generator 12. The instantaneous electric field set up in crystal 17 by the modulation pulses is parallel to the optic axis (Z axis) of the crystal, which is arranged to be parallel to the beam of plane polarised light passing therethrough. The beam of light is arranged to pass through an antinode of the modulation field applied to crystal 17. The emergent light is elliptically polarised by virtue of the direct Pockels linear electro-optic effect in the crystal 17, the degree of ellipticity changing cyclically at the frequency applied by the modulation oscillator 18. Thus the beam of light 21 which is directed towards the distant reflector 11 is polarisation-modulated at the U.H.F. frequency.

The reflected light beam from reflector 11 passes through lenses 22 and 23 and thus returns through the crystal 17. The reflected beam is again passed through the antinode (or an adjacent antinode) of the field applied to the crystal 17. The resulting light beam 24 emerging from the crystal 17, then has its ellipticity either reduced or enhanced, depending upon the degree of ellipticity which the beam possesses as it returns through the crystal 17. The resulting light beam 24 is passed through an analyser 25 crossed with respect to polariser 15, and thence onto a photocell 26. Signals from the photocell 26 are indicated on indicator 27 and counted on a counter 28. These signals vary between a maximum and a minimum value, depending upon the degree of ellipticity of the polarised light beam returning through the crystal 17 from the reflector 11. The crystal 17, therefore, in effect, makes a phase comparison between the polarisation modulation of the outgoing and returning light beams passing through the crystal 17.

Apparatus in which a light beam is polarisation-modulated in this way is described in our British specification Ser. No. 919,368.

The modulation oscillator 18 is controlled by a standard resonant cavity 30 constructed of a material of small thermal expansion such, for example, as that sold under the trade name "Invar," and plated internally with a metal of high electrical conductivity e.g. copper, silver or gold. A small fan (not shown) is provided for drawing air from the surrounding atmosphere through the cavity resonator 30, from an inlet 31 to an outlet 32. A micrometer head 33 mounted on the resonator 30 is connected to a small tuning piston or plunger (not shown) disposed within the cavity of the resonator 30. By adjusting the micrometer head 33, the resonant wavelength of the resonator 30 may be altered, and, since the resonator is connected to the oscillator 18, the modulation wavelength of the oscillator 18 may thereby be varied. In this way the modulation wavelength may be varied continuously and accurately over a predetermined wavelength range (e.g. 5%).

To determine the distance between the crystal 17 and reflector 11, the resonator 30 is adjusted until either the phase difference $p$ has the reference value $p_0$ (in practice) a maximum or a minimum reading, on the indicator 27. In this configuration, the total distance travelled by the light beam from crystal 17 to the reflector 11 and back again differs from a whole number of half wave-lengths of the modulated light beam by a fixed difference of $p_0/2$. The resonator wavelength is now varied to thereby vary the modulation wave-length. Whilst moving the micrometer head 33, the number $n$ of maxima (or minima) through which the indicator 27 passes is noted, and the initial and final micrometer head readings are also noted.

The modulation wavelength can in this case be noted at the start and at the finish of the "$n$-count." Thus if at the modulation wavelength $\lambda_1$ is such that the distance $(d+I)$ contains $(N_1+p_0)$ modulation half wavelengths and if the final modulation wavelength $\lambda_2$ is such that the distance $(d+I)$ contains $(N_2+p_0)$, modulation half-wavelengths, $N_1$ and $N_2$ being respective integral numbers, then, from Equation 1, $$N_1 \frac{n\lambda_2}{\lambda_2 - \lambda_1} - p_0 \qquad (5)$$

where $n = N_1 - N_2$, the fractional term $\delta$ in Equation 1 being in each case zero. The micrometer head 33 gives readings of the resonator dimensions from which the initial and final wavelengths $\lambda_1$, $\lambda_2$ can be evaluated, by virtue of Equation 3. Knowing these wavelengths and $n$, it is possible to evaluate $N_1$ by rounding Equation 5 to the nearest whole number.

Having thus evaluated $N_1$ the distance $d+I$ can be found accurately by substitution in Equation 4 and hence, since $I$ is a fixed parameter of the apparatus, $d$. For a resonator 30 in which the resonant wavelength is varied by changing a single dimension, D, we may write: $\lambda = KD$, where, from Equation 3:

$$K = \frac{\mu_r}{\mu_g} \cdot f(l, m, n)(l+H+T+t+P)$$

Equation 5, for evaluating the integer $N_1$, may then be written:

$$N_1 = \frac{nD_2}{D_2 - D_1} - p$$

and Equation 4, for determining the distance $d$ becomes:

$$d+I = \frac{1}{2} N\, KD_1 + \frac{1}{2} pKD_1 \qquad (6)$$

$D_1$ and $D_2$ being the cavity readings of the micrometer head 33 corresponding to the initial and final modulation wavelengths $\lambda_1$ and $\lambda_2$, respectively.

The calculation of the distance $d$ is, however, greatly simplified if modulation wavelengths corresponding to standard length measures are employed. Thus, for example, it will be supposed that the cavity resonator 30 can be tuned to a cavity reading $D_A$ which corresponds accurately to a modulation wavelength $\lambda_A$ of 2 feet.

Starting at the cavity reading $D_A$, the cavity wavelength is steadily increased until a first cavity reading $D_1$, at which the phase difference $p$ first has the "reference" value $p_0$, is reached. The change in the phase difference $p$ in moving from $D_A$ to $D_1$ cannot be more than a half a modulation wavelength, so that the whole number of half wavelengths in the distance $d$ at both readings $D_A$ and $D_1$ is the same, $N_1$. At the reading $D_1$, Equation 6 applies; at the reading $D_A$, the distance $d$ is given by Equation 4

$$d+I = (N_1+p_0+\delta_A)KD_A/2 \qquad (7)$$

where $\delta_A$ is the fraction of a modulation half-wavelength by which $d+I$ exceeds the distance $N_1\lambda 1/2$, that is, the "adjustment" which must be applied to the value which the phase difference $p$ has at the cavity reading $D_A$ to give the desired "reference" value $p_0$.

The cavity wavelength is now steadily increased until a cavity reading $D_B$, bearing an exact, predetermined relationship to the initial reading $D_A$ is reached, the number of times $n$, during this change, that the reference value $p_0$ of the phase difference repeats itself being noted, as before. The reading $D_B$ is preferably chosen so that the ratio $D_B/D_B - D_A$ is a predetermined exact ratio, R.

It will be appreciated that the value of the phase difference $p$ at the reading $D_B$ will not, in general, coincide with the reference value $p_0$, since $D_B$ is chosen with reference only to the initial standard reading $D_A$. A further adjustment, $\delta_B$, will thus be necessary to bring the phase difference $p$ back to the reference value $p_0$. This can be done by further increasing the wavelength from $D_B$ until the next occurrence of a reference value $p_0$, at a reading $D_2$. At both the readings $D_B$ and $D_2$ the number of whole modulation half wavelengths in the distance $d+I$ is the same, namely $N_2$. From Equation 4 at $$N_1 - N_2 = n$$

the cavity reading $D_2$:

$$d+I = (N_2+p_0)KD_2/2$$

analogously to Equation 6, and at the cavity reading $D_B$:

$$d+I = (N_2+p_0+\delta_B)KD_B/2$$

analogously to Equation 7.

The Equation 5 for evaluating the integer $N_1$ now becomes:

$$N_1 = \frac{nD_2}{D_2 - D_1} - p_0 = \frac{D_B}{D_B - D_A}(n+[\delta_A - \delta_B]) - \delta_A - p_0$$

That is $$N_1 = Rn + R[\delta_A - \delta_B] - \delta_A - p_0 \qquad (8)$$

Since the term $Rn$ is always an integer, the integer $N_1$ can be evaluated from Equation 8 simply by rounding $R[\delta_A - \delta_B] - \delta_A - p_0$ to the nearest whole number. The distance to be measured, $d$, is then determined as previously, by inserting the value of $N_1$ so found into Equation 7.

In the example quoted above, where the cavity is such that $\lambda_A$ is exactly 2 feet, the Equation 7 for deriving the distance is greatly simplified, since $$\frac{KD_A}{2}$$

is then exactly 1 foot:

$$d+I = (N_1+p_0+\delta_A) \text{ feet} \qquad (9)$$

The reference value $p_0$ of the phase factor can conveniently be chosen to be zero.

The fractional "phase adjustments" $\delta_A$, $\delta_B$ can be determined indirectly from a knowledge of the intermediate cavity reading $D_1$, $D_2$, or by using a variable path device in the appaartus, as will be described later. The adjustment $\delta_A$ is given in terms $D_1$, $D_A$ by the following equation, derived from Equations 6 and 7:

$$\delta_A = n\left(\frac{D_1 - D_A}{D_2 - D_1}\right) \cdot \frac{D_2}{D_A} \qquad (10)$$

Similarly, $$\delta_B = n\left(\frac{D_2 - D_B}{D_2 - D_1}\right) \cdot \frac{D_1}{D_B} \qquad (11)$$

Alternatively, the "phase adjustments" $\delta_A$ and $\delta_B$ can be measured directly as the modulation frequency is changed if a phase indicator is provided, in which case it is not necessary to know the cavity readings $D_1$ and $D_2$.

The method of obtaining $\delta_A$, $\delta_B$ from Equations 10 and 11 is, of course, equivalent to obtaining them from the ratio of $D_A - D_1$ to the difference between any two adjacent phase comparison settings, (i.e. for one phase "cycle" between any two adjacent points of equal $p$). For example, if the modulation wavelength were increased from the cavity reading $D_1$ until the next position of the reference phase difference $p_0$ occurred, at a cavity reading of (say) $D_{11}$
Then $$\delta_A = \left(\frac{D_1 - D_A}{D_{11} - D_1}\right) \frac{D_{11}}{D_A} \qquad (10a)$$

(since $n$ between $D_1$ and $D_{11}$ is unity)
Similarly $$\delta_B = \left(\frac{D_2 - D_B}{D_{21} - D_2}\right) \frac{D_{21}}{D_B} \qquad (11a)$$

When $D_{21}$ is the next cavity reading corresponding to the reference phase difference $p_0$ after $D_2$. Clearly
$$D_{11} - D_2 = D_{21} - D_2$$
since adjacent points of equal phase difference $p$ occur with equal wavelength differences.

An alternative to accurately adjusting the wavelength of the resonator 30 by means of the micrometer head 33 is to change the modulation wavelength of a variable cavity and to monitor the wavelength of the variable cavity with two standard cavity resonators, the resonant wavelengths of which are accurately known. The change of modulation wavelength can then be achieved accurately by using one standard resonator to indicate the start of the change and the other standard resonator to indicate the finish of the change.

Figure 3:
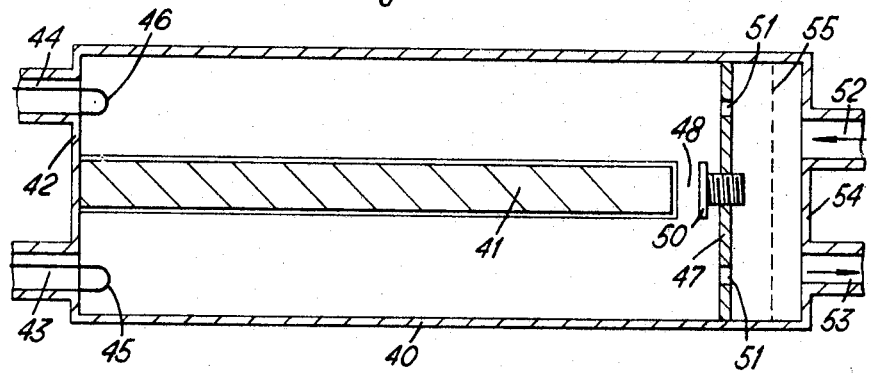
FIG. 3 is a diagrammatic axial section of one form of standard cavity resonator which may be used with apparatus according to the invention.

One form of such standard cavity resonator is shown in diagrammatic section in FIG. 3. The cavity has an outer cylindrical body 40 which may be formed of, for example, copper, copper plated "Invar" or plated fused quartz. On "Invar" or fused quartz rod 41 is centrally disposed within the cylindrical body 40 and extends axially thereof, being clamped to one end wall 42 of the cavity. The length of the rod 41 is arranged to be slightly less than $\lambda/4$, where $\lambda$ is the desired cavity wavelength.

The interior of the body 40 and the exterior of the rod 41 are silver plated and provided with a "flashed" gold surface.

Coaxial lines 43, 44 feeding coupling loops 45, 46 located in the end wall 42 of the cavity carry respectively the input and output of the cavity. The cavity, together with the rod 41, acts effectively as a quarter-wave resonant line, the wavelength of which is determined by the length of the rod 41.

The cavity is bounded at the end remote from the end wall 42 by a partition 47 formed of the same material as the body 40 and spaced from the end of the rod 41 by a small air gap 48. A centrally disposed tuning plunger 50 is mounted in the partition 47 directly opposite the rod 41, the plunger 50 being screw-mounted for axial movement towards or away from the end of the rod 41. Axial movement of the tuning plunger 50 alters the effective capacitance $C_T$ between the end of the rod 41 and the body 40, and thereby alters the resonant wavelength of the cavity. Thus the tuning plunger 50 can be used as a trimming adjustment for the cavity wavelength.

A typical value for the "trimming capacitance" $C_T$ constituted by the air gap 48 is 0.1 pF.

By constructing the material of the rod 41 of different material from the cylindrical body 40 of the resonator, a degree of compensation for the effects of thermal expansion on the cavity wavelength can be obtained. Thus, if, for example, the body 40 were of copper and the rod 41 of "Invar," it could be arranged that the tendency for the resonant wavelength of the rod 41 to increase due to thermal expansion on increase of temperature is offset by the increase in the trimming capacitance $C_T$ brought about by the greater thermal expansion of the body 40, such increase in the trimming capacitance $C_T$ tending to increase the resonant frequency of the cavity.

In accordance with one mode of use of the invention, as previously described, air from the site of measurement is continuously circulated through the cavity through holes 51 is the partition 47, the air entering and leaving the cavity through conduits 52, 53 respectively located in the other end wall 54 of the cavity. A filter 55, represented by broken lines in the drawing, is disposed in the space between the partition 47 and the end wall 54 to trap any dust particles in the air.

Figure 4:
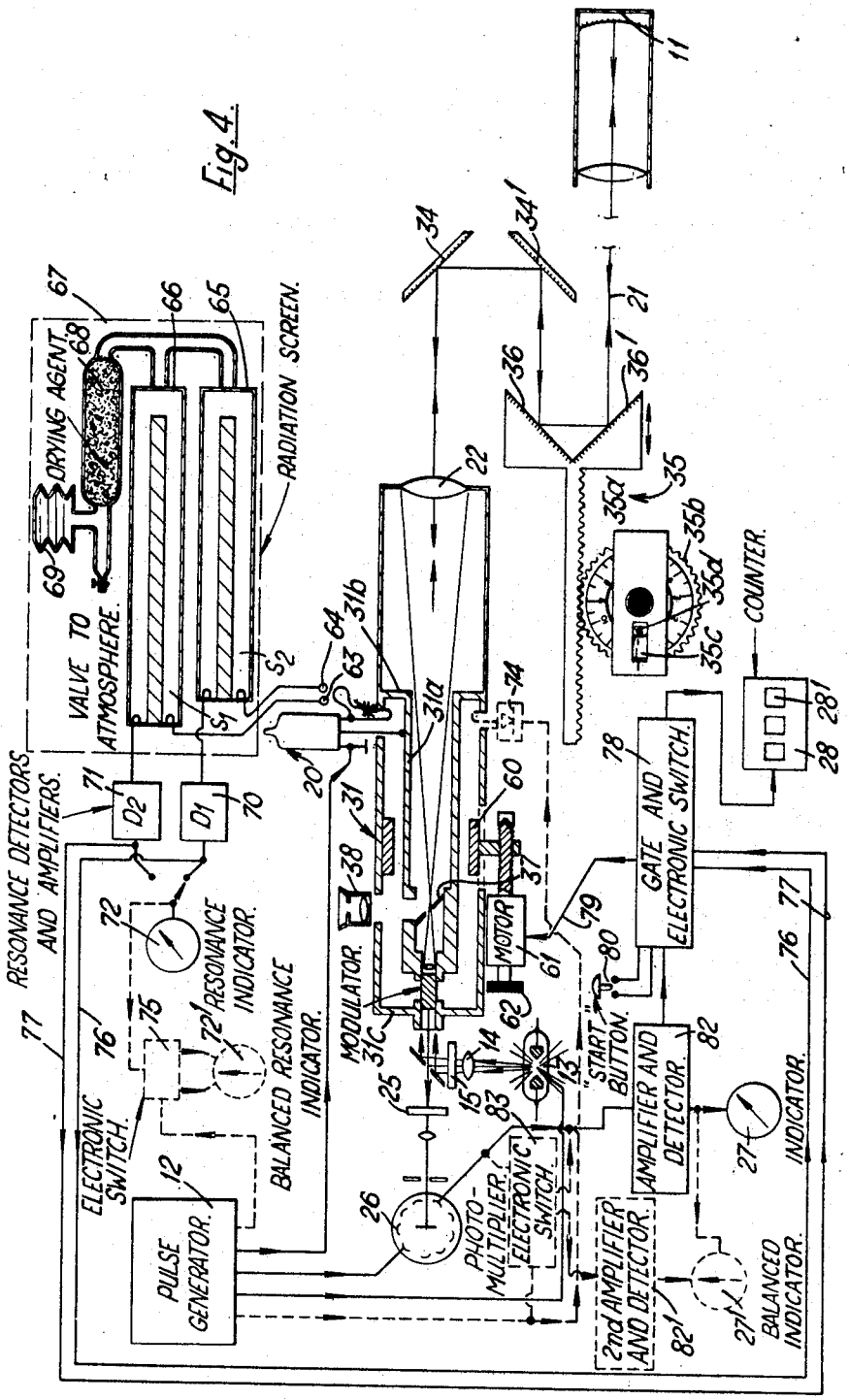
FIG. 4 shows diagrammatically an arrangement of a preferred embodiment of appaartus according to the invention.

As explained above, the air circulated through the cavity is preferably dried when the "carrier" radiation is light. Continuous circulation of dry air through the cavity, however, consumes large quantities of drying agent. The consumption of drying agent can be reduced in two ways, both of which avoid continuous circulation of air in the cavity. One way is to seal the cavity except for a single conduit (for example 52 in FIG. 2) leading into a drying chamber (not shown) containing silica gel, or some other convenient drying agent. The drying chamber is arranged to be open to atmosphere (to equalise the pressure in the cavity and atmospheric pressure) only at the time of making a distance measurement, for example by opening a tap attached to the chamber. Alternatively, the resonant cavity and the drying chamber connected thereto are both sealed from the atmosphere at all times. In the latter arrangement, means for equalising the pressure in the cavity and atmospheric pressure, such as a bellows, a flexible bladder, or piston device must be provided, as shown in FIG. 4 (later).

It will be appreciated that in both the arrangements described in the preceding paragraph, in which there is no circulation of air in the cavity, it is necessary to locate the cavity in such a position that it can acquire, at least approximately, the ambient air temperature, the cavity preferably being surrounded by a radiation shield to assist this equalisation of temperatures.

If, however, the air in the resonant cavity is not dried as, for example, when a microwave "carrier" radiation is used, or a humidity correction H is applied (as described above) it is desirable to arrange for circulation of air through the cavity in order to ensure that the relative humidity of the air in the cavity is the same as that of the atmosphere at the site of measurement. The humidity correction H can then be calculated from relative humidity measurements (by means of, for example a conventional wet-and dry-bulb hygrometer) made in the atmosphere. Failing such an arrangement, it would, of course, be necessary, in the case of a radio frequency or microwave carrier radiation, to apply a further correction term for the difference between the water vapour pressure in the cavity and the average water vapour pressure over the distance to be measured.

An example of the "inherent" refractive index compensation afforded by the method of the present invention will be given with reference to the modulation of "sodium" yellow light in air at RF, VHF, UHF or microwave frequencies. The refractive index of air for the modulated sodium light is:

$$\mu_g = 1 + 108 \times 10^{-6} P/t$$

and the refractive index of dry air for the modulation waves (RF, VHF, UHF or microwave) in the cavity is
$$\mu_r = 1 + 104 \times 10^{-6} P/t$$

where P is the atmospheric pressure in mm. of mercury and $t$ the atmospheric temperature in degrees absolute (° K). Thus the ratio $$\frac{\mu_g}{\mu_r} = 1 + \frac{P}{t}(108 - 104)10^{-6} = 1 + \frac{4P \times 10^{-6}}{t}$$

by the binomial theorem, ignoring terms in $$\frac{(P \times 10^{-6})}{t}$$

of second and higher orders, which will be very small.

From the above expression it is clear that atmospheric pressure and temperature P and $t$ respectively have a negligible effect on the ratio $\mu_g/\mu_r$, so that only one evaluation of this ratio, for some "standard" atmospheric conditions (e.g. at sea level, 760 mm. Hg, 293° K.) is necessary. Under such "standard" conditions $(4P/t)$ is approximately 10, so that $$\mu_g/\mu_r = 1.00001$$

Even when extreme atmospheric conditions are encountered the effects of atmospheric temperature and pressure do not produce any substantial variation in the value of the ratio $\mu_g/\mu_r$ evaluated under "standard" conditions. For example, if the distance measuring apparatus, having been calibrated with $\mu_g/\mu_r$ calculated for "standard" (sea level) conditions, were used at an altitude of, for example, 18,000 feet, the appropriate value of $4P/t$ would be about 5, so that the "standard" value of $\mu_g/\mu_r$ would then be in error by only 5 parts per million. Approximate knowledge of the altitude is, of course, sufficient for the purposes of applying this correction, if required. Such a nerror, it will be appreciated, would in general, be smaller than the previously mentioned error arising if one end of the distance to be measured were at a different altitude from the other.

A further method of refractive index compensation is to employ a sealed resonant cavity into which a predetermined quantity of a gas or vapour of high microwave refractive index $\mu_r$ has been introduced, in order to make $\mu_r$ equal to $\mu_g$ in the cavity. Such a result could be achieved, under "standard" atmospheric conditions by, for example, introducing 1.7 mm. pressure of water vapour or 40 mm. pressure of dry carbon dioxide mixed with dry air, into the cavity. Assuming that means for equalising the pressures and temperatures inside and outside the cavity are provided, as previously mentioned, the ratio $\mu_g/\mu_r$ would then be invariant under al atmospheric conditions.

As has been explained, distance is measured according to the present invention by, in effect, dividing an accurately known wavelength of a standard resonator into the distance to be measured. The accuracy of the method therefore depends on the accuracy with which the standard resonator is calibrated. Various methods may be used to calibrate the standard resonator or resonators employed in the apparatus:

(1) The resonators can be calibrated when installed in the apparatus by measuring an accurately known base-line with the apparatus. Once calibrated to read correctly on this base line, the apparatus will read correctly for all distances. This method of calibration does not, it is to be noted, require a knowledge of the velocity of light;

(2) The resonator dimensions to give the required wavelengths can be calculated from first principles, without requiring a knowledge of the velocity of light, or (3) The vacuum resonant frequency can be calculated for the resonator, and the required resonator dimensions deduced from a knowledge of the velocity of light.

The velocity of light is thus useful, but not essential, to the calibration.

The apparatus shown in the accompanying FIG. 4 is a preferred embodiment of the basic arrangement shown in FIG. 2. Parts which correspond to parts of the apparatus shown in FIG. 2 are indicated by the same reference numerals as are used in FIG. 2.

The ADP modulator crystal 17 is mounted in a cylindrical resonant cavity 31. The cavity 31 has a hollow central conductor 31a which is clamped to one end wall 31b of the cavity 31 and spaced from the other end wall 31c of the cavity 31. The modulator crystal 17 is disposed centrally of the cavity 31, being mounted between the end wall 31c and the central conductor 31a, the Z-axis of the crystal 17 coinciding with the axis of the cavity 31, so that the oscillating electric field set up in the cavity 31 is in the direction of the Z-axis of the crystal 17, as in the arrangement of FIG. 2.

The optical system of the apparatus shown in FIG. 4 is essentially the same as that of the apparatus shown in FIG. 2, and will not, therefore, be described in detail. It is conveniently arranged that the modulated light passes axially through the hollow central conductor 31a and through an aperture in the end wall 31b of the cavity 31 to the lens 22. After passing outwardly through the lens 22 the light is reflected through 180° by two fixed reflectors 34, 34' to a variable light path device 35 mounted externally of the cavity 31.

The variable light path device 35 comprises two reflectors 36, 36' mounted at right angles to each other on a rack 35a which is movable in the direction of the axis of the cavity 31 by means of a pinion wheel 35b. The reflectors 36, 36' reflect the light from the reflectors 34, 34' through a further 180° so that the light 21 proceeds towards the distant reflector 11.

The reflector 11 is preferably of the "cat's eye" type, as illustrated, but can also be of the corner-cube variety.

An inclined reflector 37 is mounted in the hollow central conductor 32 of the cavity 31. The reflector 37, which is provided with a central aperture for the passage therethrough of the modulated light, is adapted to reflect some light returning from the distant reflector 11 into an eyepiece 38 mounted at the side of the cavity 31. The eyepiece 38 is provided to assist initial alignment of the optical system before distance measurements are made.

The electrical modulation and electro-optical detection system of the apparatus shown in FIG. 4 is adapted for semi-automatic operation. The arrangement illustrated employs U.H.F. modulation, although it will be understood that the particular method of modulation used in this embodiment, namely polarisation modulation by the direct Pockels linear electro-optic effect, may also be used for modulation in the R.F., V.H.F., and microwave regions.

The resonant cavity 31 is supplied with U.H.F. power pulses from the pulse generator 12 through a triode amplifier 20. The resonant wavelength of the cavity 31 may be varied through a range of, for example, 5% by means of an axially movable dielectric tuning ring 60 mounted in the annular space between the outer wall of the cavity 31 and the hollow central conductor 31a. The tuning ring 60 is movable axially in this annular space by means either of a small electric tuning motor 61 or a manual tuning knob 62.

The wavelength of the cavity 31 is continuously monitored by two loose coupling loops 63, 64 which feed the oscillations of the cavity 31 to two standard resonant cavities 65, 66 respectively. The cavities 65, 66 are of the co-axial line type and are filled with dry air at substantially atmospheric pressure. The cavities 65, 66 are surrounded by a polished metal radiation screen 67. Each cavity communicates with a vessel 68 containing a drying agent, such as silica gel. Furthermore each cavity 65, 66 also communicates with pressure equalising bellows 69 which ensure that the pressure within each cavity 65, 66 is, for all practical purposes, atmospheric. Structural details of a standard resonant cavity of this type have been described with reference to FIG. 3.

The standard cavity 65 tuned to a resonant wavelength $\lambda_A$ of 2 feet exactly, while the standard cavity 66 is tuned to a resonant wavelength $\lambda_B$ of $$\left(2 \times \frac{20}{19}\right)$$

feet exactly. That is, the ratio $$R = \frac{\lambda_B}{\lambda_B - \lambda_A} = 20$$

Each of the standard cavities 65, 66 is coupled to a respective resonance detector 70, 71, each of which includes an amplifier and is designed to give an output whenever the respective standard cavity 65, 66 to which it is connected resonates, that is, whenever the wavelength of the respective standard cavity is identical with that of the variable cavity 31. Resonance of the standard cavities 65, 66 is indicated by a resonance indicator 72 which may be connected to each of the resonance detectors 70, 71 in turn through a switch 73.

To increase the sensitivity of the indication of resonance in the standard cavities 65, 66 the alternative null arrangement indicated in broken lines may be used. A variable reactance 74 is coupled into the variable cavity 31. The variable reactance 74 is connected to the pulse generator 12, the arrangement being such that the resonant frequency of the variable cavity 31 is changed by about one part in 10,000 between alternate pulses. At the same time, alternate pulses from the standard cavity in question are fed, through the switch 73, to alternate amplifiers of a pair of balanced amplifiers (not shown) through an electronic switch 75 which is synchronised with the pulse generator 12. The outputs of the alternate amplifiers are fed to a balanced resonance indicator 72' which will, therefore, indicate a cavity resonance by a null reading.

The outputs of the respective resonance detectors 70, 71 are connected via respective leads 76, 77 to a combined switch and gating unit 78. The switch and gating unit 78 has a first output lead 79 connected to the tuning motor 61 such that, on closing of a "start" switch 80 connected to the unit 78 the motor 61 is energised and drives the tuning ring 60 in a direction such as to increase the wavelength of the cavity 31.

The output of the photomultiplier 26 is connected to an amplifier and detector 82 which detects maxima in the photo-multiplier output. The amplifier-detector 82 is connected, through the switch and gating unit 78, to the counter unit 28, which is adapted to count the number of maxima detected and "gated" through the unit 78, the said number being displayed in windows 28' provided in the counter unit 28.

The detection of maxima in the output of the photomultiplier 26 may be rendered more sensitive by using a balanced amplifier and detector unit 82' also shown in broken lines in FIG. 4, and adapted to be used in conjunction with the variable reactance 74. Alternate pulses from the photo multiplier 26 (corresponding to alternate changes in the frequency of the cavity 31 by 1 part in 10,000) are fed, through an electronic switch 83 synchronised with the pulse generator 12, to the amplifiers 82, 82', these amplifiers in this arrangement forming a balanced pair. The outputs of the amplifiers 82, 82' are fed to a balanced indicator 27'. The indicator 27 will have null (zero) reading when the photomultiplier 26 has a maximum output. This arrangement is more sensitive than using a single amplifier and detector 82, since a null is detectable with greater precision than a maximum.

In operation, the apparatus of FIG. 4 is used as follows to make a distance measurement. Light traversing the distance to be measured is polarisation-modulated by virtue of the Pockels direct linear electro-optic effect in the ADP crystal 17, as in the arrangement of FIG. 2. The pulse generator 12 excites the triode amplifier 20 which maintains U.H.F. oscillations at about 500 mc./s. in the variable cavity 31.

The optical system of the apparatus is aligned with the distant reflector 11 using either the eyepiece 38 or an external sighting arrangement.

The variable cavity 31 is first tuned, using the manual tuning knob 62, until its wavelength coincides with the resonant wavelength $\lambda_A$ of the standard cavity 65. Thus with the switch 73 in the position shown, the variable cavity 31 is tuned until the resonance indicator 72 (or, as the case may be, the balanced resonance indicator 72') indicates resonance of the standard cavity 65.

The variable light path 35 is then adjusted, using the pinion wheel 35b, until the indicator 27 shows a maximum (or, alternatively, until the balanced indicator 27' indicates a null). This condition corresponds to a reference modulation phase difference $p_0$ of zero. The amount, $i$, by which the light path 35 is altered is read directly from an outer scale, 35c, provided on the pinion wheel 35b and reading in inches direct. This amount $i$ is added to the fixed instrumental correction I.

The apparatus is now ready to begin the "$n$-count". It will be appreciated that, since the "$n$-count" commences at a standard cavity wavelength, which is also arranged to coincide with a detector maximum, the phase adjustment $\delta_A = 0$.

To start the "$n$-count" the "start" switch 80 is closed, causing the motor 61 to drive the tuning ring 60 along the variable cavity 31, increasing the modulation wavelength progressively. The switch 73 is now changed over so that it connects the resonance detector 71 with the resonance indicator 72. When the indicator 72 (or, as the case may be, the balanced indicator 72') indicates resonance of the standard cavity 66, the modulation wavelength of the variable cavity 31 corresponds with the wavelength $\lambda_B$ of the standard cavity 66. At this resonance condition the resonance detector 71 sends a pulse via line 77 to the switch and gating unit 78, which thereupon stops both the operation of the counter unit 28 and, through the line 79, of the motor 61. The number displayed in the windows 28' of the counter unit 28 is then the number $n$.

The final step in distance measurement involves adjusting the variable light path 35 until the indicator 27 indicates a maximum (or the balanced indicator 27' indicates a null). This adjustment gives the value of $\delta_B$. Since it is arranged according to this embodiment that $R=20$, the integer $N_1$ is given by $N_1 = 20n - 20\delta_B$, from Equation 8, $\delta_A$ and $p_0$ both being zero. It is therefore conveniently arranged that the pinion wheel 35b read $20\delta_B$ directly. For this purpose the wheel 35b is provided with an inner "rounding" dial 35d which is calibrated in terms of $20\delta_B$ from 0 to 19 feet. This rounding dial 35d is angularly adjusted with respect to the pinion wheel 35b and, prior to the final step referred to above, the dial 35d is set to zero. The adjustment of the variable light path 35 at the end of the "$n$-count" then gives a reading on the rounding dial 35d of $20\delta_B$ directly. This reading is rounded to the nearest whole number and subtracted from $20n$ to give the integer $N_1$.

As an additional refinement it can be conveniently arranged that the counter unit 28 counts in multiples of 20, so that it displays in the windows 28' the value $20n$ directly.

The distance $d$ required is then given by Equation 9, since $\lambda_A/2$ is exactly 1 foot:

$$d + I + i = N_1 \text{ feet}$$

That is, $$d = 20_n - 20\delta_B - I - i \text{ feet}$$

To make a distance evaluation, therefore, the operator has only to add together the readings of the counter unit 28 ($20_n$), the reading of the "rounding" dial 35d ($20\delta_B$) the reading of the outer pinion wheel scale 35c ($i$) and the fixed instrumental correction I. By appropriate design it can be arranged that the components of this addition are all positive.

The inherent simplicity of the distance determination by this apparatus is an attractive feature compared with apparatus hitherto used, the use of which involves complex computation using refractive index compensation. The simplicity of the apparatus according to the invention is a direct result of the fact that refractive index and other corrections involving the velocity of electromagnetic radiation are not required. The apparatus for this reason commends itself to use in the field.

Although a direct-reading method using a variable light path 35 has been illustrated for determining the corrections $\delta_A$, $\delta_B$, it will be appreciated that other methods, involving bodily movement of the cavity 31 or the distant reflector 11, or phase measurement directly by means of an electrical delay line, may be used.

Since the apparatus of FIG. 4 includes a pulsed light source 13, which may, for example, be a pulsed semiconductor junction laser, it is conveniently arranged that the apparatus is effectively switched off between pulses. Thus if the duration of the light pulses is 1 microsec., the triode amplifier 20 may be energised for a total time of 25 microseconds for each pulse, the 1 microsecond light pulse being arranged to coincide approximately with the centre of this 25 microsecond "energisation time." The photomultiplier 26 and its associated amplifier and detector 69 may also be "gated" to be operative only during this "energisation time." During the time intervals between successive 25 microsecond pulses the photomultiplier 26 and its associated apparatus is switched off. This has the advantage that it renders the photomultiplier 26 predominantly sensitive to the pulsed light used for the distance measurement, with which it is synchronised, and relatively insensitive to steady background light which may enter the optical system. The apparatus when operated in this way may therefore be used even when the variable cavity 31 is directed towards strong sunlight. Another advantage of operating the apparatus in this way is that the drain on power supplies is much lower than would be the case if the apparatus were energised continuously. This gives rise to the possibility of operating the apparatus from a battery source of power, with obvious advantages to the user of the apparatus in the field.

An alternative method according to the invention, which does not require a continuously variable modulation wavelength, may be employed if a number (at least three) of fixed wavelength standard resonators are available. Referring to the basic Equation 8:

$$N_1 = \frac{D_B}{D_B - D_A} (n + [\delta_A - \delta_B]) - \delta_A - p_o$$

In this case, $n$ is not measurable, since the modulation wavelength cannot be changed continuously. The ratio $$R = \frac{D_B}{D_B - D_A}$$

is therefore selected to be such that $n$ is zero. Thus, for example, if $$\frac{KD_A}{2} = 1 \text{ foot}$$

as before, and if $$\frac{D_B}{D_B - D_A} = 10,000$$

then, provided the distance to be measured is less than 10,000 feet $n$ will always be zero. It will be supposed that the corrections $\delta_A$, $\delta_B$ can be estimated to within 1%. Insertion of the known values of $D_B$ and $D_A$ in the above equation will then give the distance to the nearest 100 feet.

It will be supposed that a third resonator is available having a resonant wavelength $\lambda_C$ such that $$\frac{\lambda_c}{\lambda_c - \lambda_A} = \frac{D_c}{D_c - D_A} = 100$$

$D_c$ being the appropriate resonator length. The number $n$ is in this case unknown. If measurements of the appropriate phase corrections $\delta_A$, $\delta_C$ are made using the resonators A and C, then $$N_1 = \frac{D_c}{D_c - D_A} (n + [\delta_A - \delta_C]) - \delta_A - p_o$$

This equation will give a value of $N_1$ and $d$ dependent on the value of $n$ used, to the nearest foot, with intervals of 100 feet between the values of $d$ obtained with consecutive values of $n$. The correct value of $n$ can, however, be resolved unambiguously as that value which gives a value of $d$ consistent with that found using $D_A$ and $D_B$. Successive approximations, using further standard resonators, are possible to the degree of accuracy required. This method is analogous to the "method of fractions" employed in interferometry.

Further variations on the method according to the invention are possible using only one standard resonator. Thus if a resonator of wavelength $\lambda_A$ is available, the other wavelength $\lambda_B$ could be derived, for example, by standard electric or electronic arithmetical processes operating on the resonator of wavelength $\lambda_A$. Alternatively, the two wavelengths $\lambda_A$, $\lambda_B$ could be derived from a single resonator having two resonant wavelengths, for example, two resonant modes of a standard cavity. This method is particularly applicable where one wavelength is an integral multiple of the other. A further possibility which presents itself, particularly if Laser beam methods are used for effecting the modulation and/or phase comparison, is to use a single standard resonator of wavelength $\lambda_A$ and vary the modulation wavelength from $\lambda_A$ to infinity (i.e. zero modulation frequency). In this case the number $n$ of maxima detected during the change would equal the integer order N of half wavelengths $\lambda_A/2$ in the distance to be measured.

It will be understood that in putting the present invention into practice other methods of modulating the electromagnetic carrier radiation may be used; furthermore, the modulation need not be polarisation modulation, as in the embodiments hereinbefore described, but any form of modulation could be employed. Thus, intensity, amplitude, frequency or phase modulation could alternatively be used. Intensity amplitude, phase or frequency modulation could be produced by the superimposition of two or more coherent carrier radiations of different frequencies derived, for example, from laser sources.

The method of phase comparison used to compare the modulation phase of the outgoing and returning radiation may take any convenient form, dependent on the type of modulation employed. The accompanying FIGS. 5–8 illustrate an embodiment of apparatus according to the invention in which phase comparison is effected by means of a phase-coherent degenerate parametric amplifier. This method of phase comparison has the advantage of affording a direct and sensitive indication of the relative modulation phase of the returning radiation, particularly when intensity modulation is employed.

Figure 5:
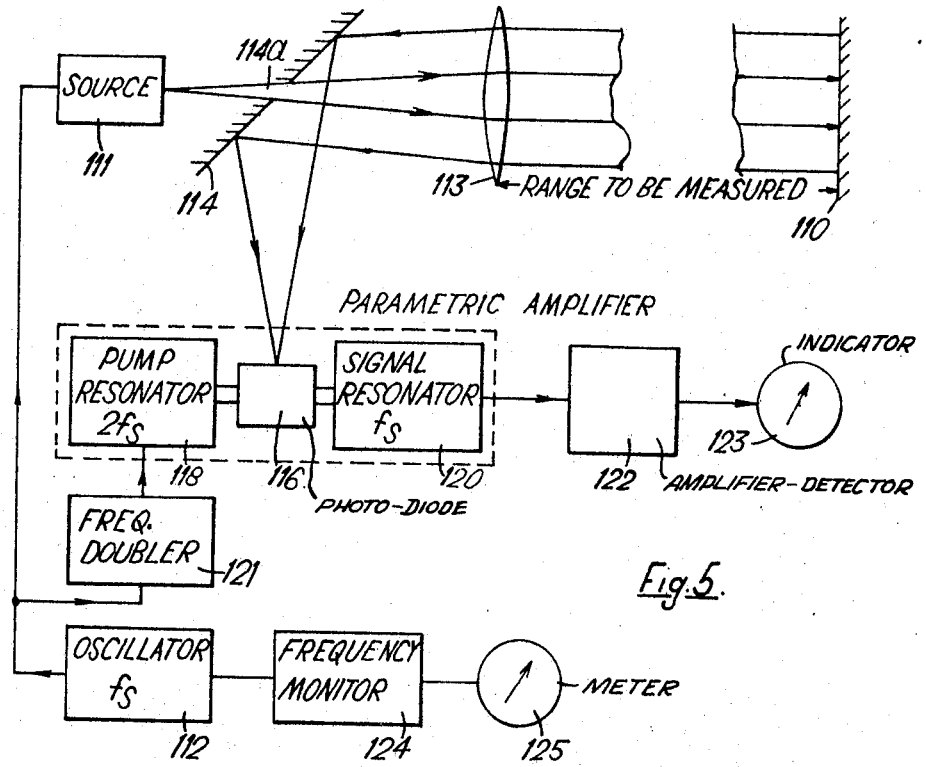
FIG. 5 is a schematic diagram showing the general arrangement of an alternative apparatus for carrying the invention into effect.

FIG. 5 shows apparatus for measuring the range of a reflector 110 from a modulated transmitter 111. The modulated radiation from the transmitter 111 is intensity modulated at a constant preferably ultra-high (U.H.F.) frequency $f_s$ produced by an oscillator 112. The modulation frequency $f_s$ may be for example 500 mc./s. The modulated transmitter 111, which may, for example, operate by laser action, is purely schematically indicated by the block referenced 111 and may be of any suitable form known per se, for example, a gallium arsenide or silicon carbide electroluminescent solid state diode. It provides a very narrow emergent beam of carrier radiation, in this example, light, which is intensity modulated by the U.H.F. electrical control input applied thereto from the oscillator 112. The carrier radiation is, of course, not necessarily visible light: it could, for example, be infrared radiation.

The modulated light is projected as a narrow, substantially parallel beam via a suitable optical system represented for simplicity by a single lens 113 to the reflecting object 110 whose distance is to be measured. Any convenient means may be used to pass the light for transmission and receive the light reflected back. Such means are represented in FIG. 1 by a 45° mirror 114 with a central aperture 114a through which the light for transmission passes.

The returned reflected light from the object 110 is projected by the mirror 114 onto a light-sensitive variable reactance constituted by a semi-conductor photo-diode 116 which manifests a reactance value dependent on the voltage applied thereto. The diode 116 is connected as the variable reactance of a phase coherent degenerate parametric amplifier 117 schematically represented within broken lines. The parametric amplifier 117 includes a so called pump circuit or resonator 118 and a so called signal circuit or resonator 120. The diode 116 thus acts both as a photodetector sensitive to the modulation in the returned reflected light and also as the capacitance (of value dependent on the pump signal) constituting the varying coupling reactance of the phase coherent degenerate parametric amplifier 117.

The pump frequency of the amplifier 117 is chosen to be exactly twice the modulating frequency applied to the transmitted radiation. As shown the pump frequency is derived from the oscillator 112 employed to provide the modulation, the output from this oscillator being doubled in frequency by any convenient frequency doubler 121 and applied to the pump circuit 118. Clearly, however, the pump circuit input could be derived, if desired, from a separate oscillatory source of the same frequency as and coherent with the oscillator 112. The signal circuit 120 of the amplifier 117 is resonant at the modulation frequency $f_s$ so that the pump frequency is twice the signal frequency as is, of course, necessary for a phase coherent degenerate parametric amplifier.

Output from the signal circuit 120 of the phase coherent parametric amplifier 117 is amplified and detected by an amplifier-detector 122 and indicated by an indicator 123. The frequency of the oscillator 112 is monitored or controlled by a monitoring circuit including a cavity resonator 124 and a meter 125 for indicating resonance of the resonator 124. If required the frequency of the resonator 124 may be variable over a small range. A suitable form of cavity resonator 124 for use at U.H.F. wavelengths has been illustrated in FIG. 3.

It is important in the design of the apparatus that the relation between the pump frequency and the modulation frequency $f_s$ shall be fixed with the pump frequency equal to $2f_s$ and the relation undisturbed by varying phase changes in the apparatus itself. Constancy of phase shift in the various circuits fed from the oscillator 112 is of the first importance, for, as will be seen, the phase-coherent degenerate parametric amplifier 117 gives a gain dependent on the phase of the input to the photo-diode 116. The amplifier output is dependent on this phase and accordingly it is an essential requirement that this phase shall be determined solely by the phase difference between the modulation of the transmitted and received radiation at the mirror 114.

FIG. 6 is a diagram showing parts of the arrangement of FIG. 5 in more detail. In FIG. 6 parts corresponding to the parts shown in FIG. 5 are indicated by like reference numerals, and little further explanation is required for those skilled in the art. In the interests of low noise the frequency doubler 121 is constituted by a T-form network comprising a circuit 121b resonant at the required pump frequency $2f_s$, a circuit 121c resonant at the signal frequency $f_s$ and, in the shunt arm of the T, a varactor, conventionally represented as a rectifier and capacitance in series combination, 121a and a series inductor 121d. The output frequency $2f_s$ is applied from the frequency doubler 121 to the pump frequency resonator 118 of the parametric amplifier 117, the signal frequency resonant circuit of which is shown at 120. The light sensitive variable capacitance device, the photodiode 116, is represented conventionally in FIG. 6 by a detector and variable capacitance in series, the three short arrows representing incident light.

Signal frequency output from the parametric amplifier 117 is taken via a transmission line to a low noise frequency converter, preferably employing a tunnel diode, the local oscillator of which is shown at 128 and the mixer of which is shown at 129. The local oscillator 128 is controlled by an A.F.C. control circuit 130 fed from the oscillator 112 to oscillate at a frequency which differs by a fixed amount, $f_i$, from the signal frequency $f_s$, $f_i$ being selected to result in a desired beat or intermediate frequency. Thus, to quote practical but non-limiting values, if $f_s$ is 500 mc./s. a convenient intermediate frequency $f_i$ is 10.7 mc./s. In FIG. 2 the output of the local oscillator 128 is applied to the mixer 129. The output of the mixer 129, of frequency $f_i$, is amplified by an I.F. amplifier 132 before being passed to an amplitude modulation detector 133. The output of the detector 133 is indicated by an indicator 123.

Assuming absence of undesired phase variations in the various parts of units 121 and 111, the gain G of the phase-coherent degenerate parametric amplifier 117 (see FIG. 8) will be a function of the phase difference P between the modulation of the light transmitted from the transmitter 111 and that of the light input to the photo-diode 116. The gain G will be a maximum $4G_o$ when P is zero, falling off very rapidly either side of this maximum. G is thus directly related to the total path distance D traversed by the modulated light from the transmitter 111 to the photo-diode 116 via the reflector 110.

The power gain G of the phase-coherent degenerate parametric amplifier 17 may be expressed in the form $$G = 4G_o \cos^2 \frac{4\pi(D+I)}{\lambda_m} \quad (12)$$

where:

$G_o$ is the gain under non phase-coherent degenerate conditions;

$\lambda_m$ is the modulation wavelength; and

I is an instrumental phase correction expressed as a distance.

The distance D may be determined with respect to a fixed fiducial mark on the apparatus or on the reflector 110. The instrumental phase correction I includes corrections for the positions of the various parts of the apparatus in relation to such a fiducial mark, and also includes corrections for the phase delays in the various electrical circuits and leads. The above mentioned phase difference P is, of course, present in Equation 12 as the term $$\frac{4\pi(D+I)}{\lambda_m}$$

Figure 8:
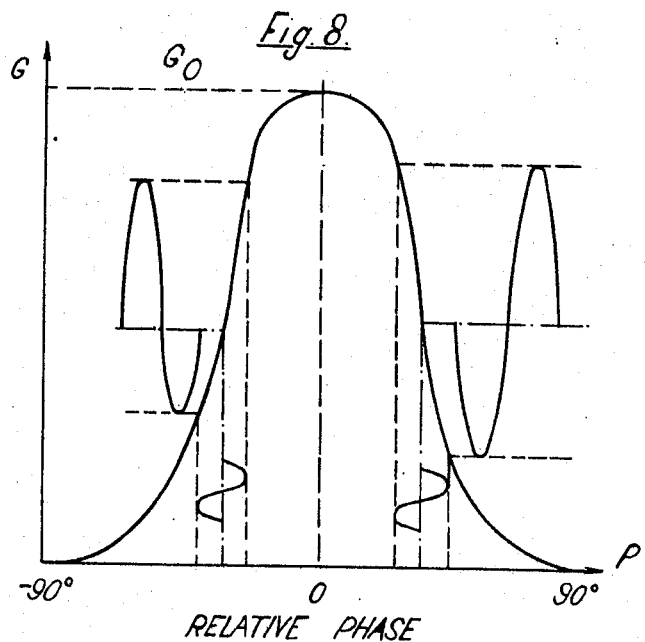
FIG. 8 is a graph showing the phase dependence of the gain of the parametric amplifier included in the apparatus of FIGS. 5, 6 and 7.

Thus, if the detector at 122 (FIG. 5) is a square law detector, the curve of FIG. 8 connecting relative phase P and gain G will be of the form:

$$G = 4G_o \cos^2 P$$

The indication given by the indicator 123 (FIG. 5) will go from maximum to minimum or vice versa for a change of distance between the transmitter 11′ and the reflector 110 by a quarter of a modulation wavelength $\lambda m/4$.

The invention has the important advantages of high phase sensitivity and low noise level, especially in what may be termed the "antiphase" condition, that is, when the phase difference P is 90°, and accordingly the pump resonator 118 absorbs power from the input signal at the modulation frequency $f_s$. This fact may be taken advantage of to obtain higher accuracy of distance measurement by not using the indicator 123 to read distance but instead by altering the total path distance D, for example, by moving the reflector 110 or the transmitter 111, until a null or minimum reading of the indicator 123 is obtained and noting the amount δ of alteration necessary to achieve this. The distance D will then be given by:

$$D + I = \left(N + \frac{1}{2}\right) \frac{\lambda_m}{4} + \delta \quad (13a)$$

where N is an integer.

Alternatively, D may be adjusted by an amount δ until the indicator 123 reads a maximum, when the distance D will be given by $$D+I=N\frac{\lambda_m}{4}+\delta \qquad (13b)$$

Figure 7:
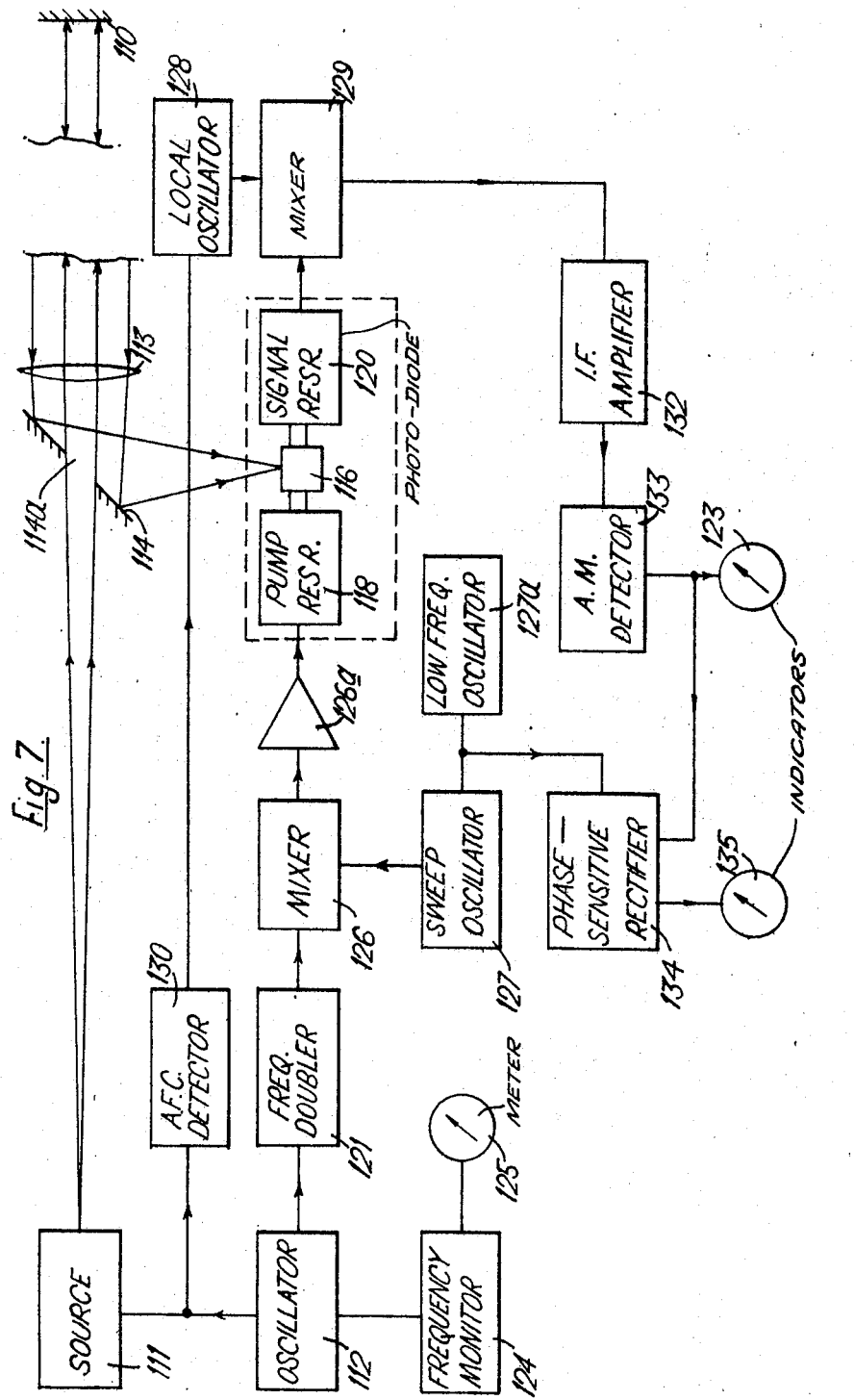
FIG. 7 is a block diagram showing a modification of the apparatus of FIG. 5.

FIG. 7, in which similar reference numerals to FIG. 5 are used, shows a preferred modification of FIG. 5 in which provision is made for frequency modulating the pumping signal of the parametric amplifier 117. Output of frequency $2f_s$ from the frequency doubler 121 is frequency modulated in a modulating mixer 126 by a sweep signal generated by a sweep oscillator 127 of relatively low frequency. The frequency modulated output from the mixer 126 is amplified in an amplifier 126a and fed to the pump resonator 118 of the parametric amplifier 117.

The output from the amplitude modulation detector 133 is also fed, in this modification, to a phase sensitive rectifier or phase comparator 134, the second input to which is provided by a low frequency oscillator 127a; the frequency of sweep oscillator 127 is swept by the low frequency oscillator 127a so that the output from the comparator 134 is representative of the phase difference of the two inputs thereto. This output is indicated by an indicator 135.

The sweep signal frequency modulation of the pumping signal results in a portion of the gain characteristic (FIG. 8) of the parametric amplifier being swept cyclically. The output of the amplifier 117 will thus be amplitude modulated, the phase of the modulation depending on the sign of the relative phase P. If the relative phase P is positive (i.e. to the right of the central maximum in FIG. 8) the modulation of the output will be out of phase with the sweep signal, while if P is negative (i.e. to the left of the maximum in FIG. 8) the modulation of the output will be in phase with the sweep signal. The indicator 135 of the phase comparator 134 is arranged to indicate whether the phase difference P is a phase lead or a phase lag, and this in turn will indicate whether the "excess distance" δ (over an integral number of modulation half-wavelengths in the distance D to be measured) is positive or negative. In the method of use in which the distance D is altered, this affords a method of indicating in which direction the alteration has been made.

It will be apparent that when the phase difference P is zero, corresponding to the maximum of the curve of FIG. 8, the modulation of the output signal of the amplifier 117 will have a component at twice the frequency of the sweep signal. The phase sensitive rectifier 134 will give zero output in this condition and the indicator 135 will read zero.

A convenient practical value for the sweep frequency if $f_s$ is 500 mc./s., is 10 kc./s.

The integer N in Equations 13a, 13b may be deduced by any of the methods hereinbefore described with reference to the embodiments of FIGS. 2 and 4. Since the modulation wavelength $\lambda_m$ is derived from the resonant wavelength of the monitoring cavity resonator 124, the wavelength $\lambda_m$ is expressible in terms of the dimensions of the resonator 124. In accordance therefore, with the principle of the present invention, the distance D is determined without recourse to a knowledge of the velocity of light.

The apparatus according to the invention is capable of measuring distances in the field with Geodetic accuracy, that is, with an accuracy better than one part in 50,000. The apparatus is particularly, but not solely, applicable to precision surveying measurements of distances of the order of one mile which are often called for in constructional engineering.

We claim:

1. A distance measuring apparatus for determining the length of a path comprising means transmitting over said path modulated electromagnetic radiation; receiver means for receiving the modulated electromagnetic radiation after it has been transmitted over said path; detector means for detecting the modulation phase of the received radiation; at least one cavity resonator for monitoring the wavelength of said modulated electromagnetic radiation before transmission over said path, the physical dimensions of said at least one cavity resonator, at resonance, determining the said modulation wavelength; means for rendering the temperature and pressure within the cavity resonator substantially equal to the ambient atmospheric temperature and pressure along the said path; and means for changing the resonant wavelength of said cavity resonator between at least two known values so as to determine the number of modulation wavelengths in said path and for noting during the change the total modulation phase change produced in the electromagnetic radiation received at said receiver means after transmission over the said path, said change being directly related to the length thereof.

2. An apparatus as claimed in claim 1, wherein a single cavity resonator is provided having at least one variable physical dimension, the number of modulation wavelengths in said path being determined by changing the resonant wavelength of said resonator between two known values by varying said at least one dimension.

3. An apparatus as claimed in claim 1 further comprising means for changing the modulation wavelength from a first value derived from a first standard resonator to a second value derived from a second standard resonator.

4. Apparatus as claimed in claim 1 wherein there are at least three resonators of different predetermined known resonant wavelengths and the electromagnetic radiation transmitted over said path is modulated by oscillations taken from each resonator in turn, the length of said path being determined by observation at said receiver means of the phase relations of the differently modulated radiation received after transmission over the path.

5. An apparatus as claimed in claim 1 further including means for adjusting by measurable amounts with reference to a datum, the modulation phase of the radiation received at said receiver means.

6. An apparatus as claimed in claim 5, wherein said phase adjustment means comprises means for changing by known amounts the effective length of the total path travelled by said radiation.

7. An apparatus as claimed in claim 5 wherein the said means for changing said two known values of the resonant wavelength is adjusted to provide a simple ratio between one of said wavelengths and the difference between said wavelengths.

8. An apparatus as claimed in claim 1 wherein the semi-wavelength of at least one known value of the resonant wavelength to which said resonator is tuned corresponds to a standard unit of length.

9. An apparatus as claimed in claim 1 wherein said electromagnetic radiation is visible light, and said transmitting means comprises means for polarisation-modulating the light comprising a crystal through which the light is passed and means for applying an electric field oscillating at the modulation frequency to the crystal for inducing polarisation modulation of said light by the direct Pockels linear electro-optic effect.

10. An apparatus as claimed in claim 9 further comprising analyzer means in said receiver means for examining the resultant polarization of the light after the light traverses the said path and is reflected to return over the same path, through the said crystal.

11. An apparatus as claimed in claim 9 wherein said crystal is disposed within a coaxial line resonator which applies said oscillating electric field to the crystal, and which is controlled by said resonator at least one cavity, the light passing through said crystal being directed through a central bore provided in the inner conductor of said coaxial line resonator.

12. An apparatus as claimed in claim 1 wherein said receiver means and detector means comprises a phase comparator means wherein the modulation phase of the radiation is determined relative to a datum.

13. An apparatus as claimed in claim 12 wherein the electromagnetic radiation is light and the said phase comparator means comprises a phase coherent degenerate parametric amplifier having a photosensitive coupling reactance and pump and signal circuits, said photo-sensitive coupling reactance being connected between the pump and signal circuits and receiving the modulated light which has traversed the said path, the pump circuit being driven at twice the frequency of and in fixed phase relation to the modulation of said light on transmission, whereby the gain of said amplifier is dependent on the relative modulation phase of the received light.

14. Apparatus as claimed in claim 1 wherein the said electromagnetic radiation is light and means is provided for drying gases in said cavity resonator, whereby the modulation wavelength is substantially invariant with atmospheric humidity.

15. Apparatus as claimed in claim 1 wherein said cavity resonator comprises a rod mounted within a hollow body, and an adjustable capacitance between said rod and said body, the materials and dimensions of said rod and body respectively being such that the effect of thermal expansion on the cavity resonant wavelength is substantially compensated by the effect on the said wavelength of the change in said capacitance induced by said thermal expansion.

16. Apparatus as claimed in claim 1 wherein the cavity resonator contains a predetermined quantity of atmospheric gases such that the refractive index of the gases in the cavity is substantially equal to the refractive index of the atmosphere at the site of measurement for the wavelength of said modulated electromagnetic radiation.

17. An apparatus as claimed in claim 1 wherein the source of said electromagnetic radiation is pulse-operated, said apparatus further comprising switching means for controlling the supply of electrical power to the apparatus and for permitting the supply of power thereto for a predetermined time interval in each modulation cycle, said time interval including each source-energising pulse.

18. An apparatus as claimed in claim 17, wherein said source comprises a laser device.

References Cited

UNITED STATES PATENTS

| | | |
|---|---|---|
| 2,930,278 | 3/1960 | Hansen et al. |
| 2,964,990 | 12/1960 | Pocher. |
| 2,966,090 | 12/1960 | Schöldström. |
| 3,188,634 | 6/1965 | Thompson _____ 343—12 |

OTHER REFERENCES

Froome et al.: "Distance Measurement by Means of a Light Ray Modulated at a Microwave Frequency," Journal of Scientific Instruments, vol. 38, No. 12, December 1961, pp. 458–462.

Mason: "Active Laser Tracker Begins Moving Target Test," Electronics, Jan. 10, 1964, pp. 10 and 11.

RONALD L. WIBERT, Primary Examiner

F. L. EVANS, Assistant Examiner

U.S. Cl. X.R.

343—12

UNITED STATES PATENT OFFICE
CERTIFICATE OF CORRECTION

Patent No. 3,521,956  Dated July 28, 1970

Inventor(s) Keith Davy Froome and Robert Howard Bradsell

It is certified that error appears in the above-identified patent and that said Letters Patent are hereby corrected as shown below:

In column 1, line 10, change "4,480/63" to read --44,480/63--.

SIGNED AND SEALED
NOV 3 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,521,956   Dated July 28, 1970

Inventor(s) Keith Davy Froome and Robert Howard Bradsell

It is certified that error appears in the above-identified patent and that said Letters Patent are hereby corrected as shown below:

In column 1, line 10, change "4,480/63" to read --44,480/63--.

Signed and Sealed
NOV 3 1970

(SEAL)
Attest:

Edward M. Fletcher, Jr.
Attesting Officer

WILLIAM E. SCHUYLER, JR.
Commissioner of Patents